United States Patent [19]

Bermejo

[11] Patent Number: 4,740,381

[45] Date of Patent: Apr. 26, 1988

[54] PROCESS FOR PREPARING PLANTAIN AND PRODUCT THEREOF

[76] Inventor: Miguel A. Bermejo, 111 NW. 19 Ave., Miami, Fla. 33126

[21] Appl. No.: 93,246

[22] Filed: Sep. 4, 1987

[51] Int. Cl.⁴ ............................................. A23L 1/212
[52] U.S. Cl. .................................. 426/615; 426/438; 426/484
[58] Field of Search ............... 426/438, 481, 482, 484, 426/615

[56] References Cited

U.S. PATENT DOCUMENTS

| | | | |
|---|---|---|---|
| 3,510,314 | 5/1970 | Lima et al. | 426/438 X |
| 3,627,011 | 12/1971 | Pond | 146/223 |
| 4,242,365 | 12/1980 | Numata et al. | 426/615 X |
| 4,402,988 | 9/1983 | Macfie | 426/615 X |
| 4,446,782 | 5/1984 | Black | 99/589 |
| 4,460,610 | 7/1984 | Macfie | 426/335 X |

FOREIGN PATENT DOCUMENTS

| | | | |
|---|---|---|---|
| 2545724 | 8/1977 | Fed. Rep. of Germany | 426/615 |
| 2720174 | 11/1978 | Fed. Rep. of Germany | 426/615 |

*Primary Examiner*—Arthur L. Corbin
*Attorney, Agent, or Firm*—Jesus Sanchelima

[57] ABSTRACT

A process for preparing green plantains and the product derived therefrom wherein the green plantain is radially sliced and the core removed. Next, the plantain is immersed in a salted solution with lemon juice after the skin has been removed from the slices. Then, the slices are fried briefly and then flattened out. The resulting product is then frozen and packed for shipment.

6 Claims, 2 Drawing Sheets

PROCESS FOR PREPARING PLANTAIN AND PRODUCT THEREOF

BACKGROUND OF THE INVENTION

1. Field of the Invention

The present invention relates to the processing of plantains.

2. Description of the Related Art

Traditionally bananas and plantains have been a stable food item in most South American families. This fruit has been cooked in numerous ways. One of them involves frying slices of green plantains. Usually, the green plantains are peeled, cut in slices, the slices are smashed against a flat surface and then fried. Depending on how thick the slice is, how well it was smashed and the amount of time it was fried will determine how crispy the final product is. It is a common source of complaints from those who consume these food items that the internal parts are soggy and not well cooked.

At the same time all of the plantains consumed in the United States comes from other countries mostly Latin American countries and it is quite desirable to minimize the transportation cost by eliminating the non-edible parts of the plantain. Also, the storage space required will be reduced facilitating the logistics involved.

There have been a number of banana pealing machines designed such as U.S. Pat. No. 4,446,782 issued to Black in 1984 and U.S. Pat. No. 3,627,011 issued to Pond. However, none of these disclosures describe the process disclosed herein or the article produced by this process.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a process for preparing sliced green plantains and including the removal of the core from the slices in order to facilitate the eventual prime operation by the consumer.

It is another object of this present invention to provide a process for preparing sliced green plantains that facilitates its transportation by reducing the weight of the product being transported.

It is yet another object of the present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
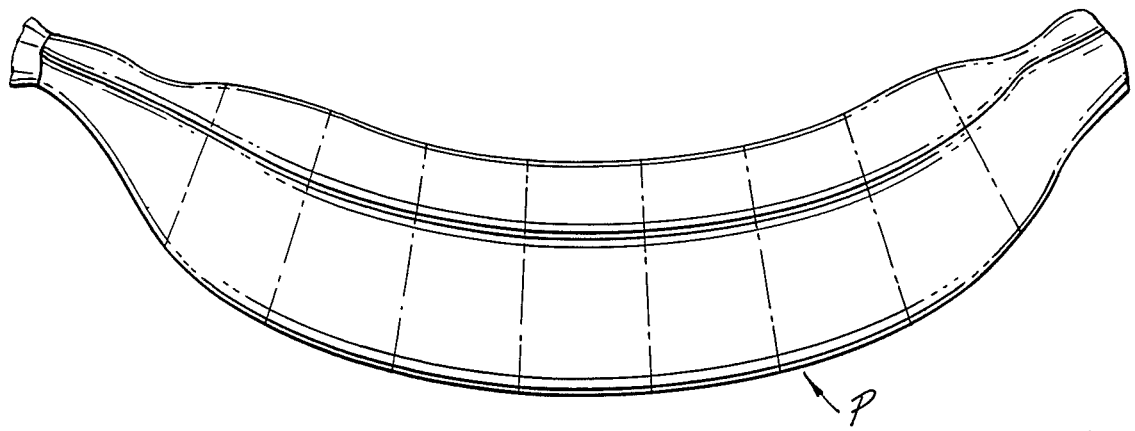
FIG. 1 represents a green plantain after being sliced.
Figure 2:
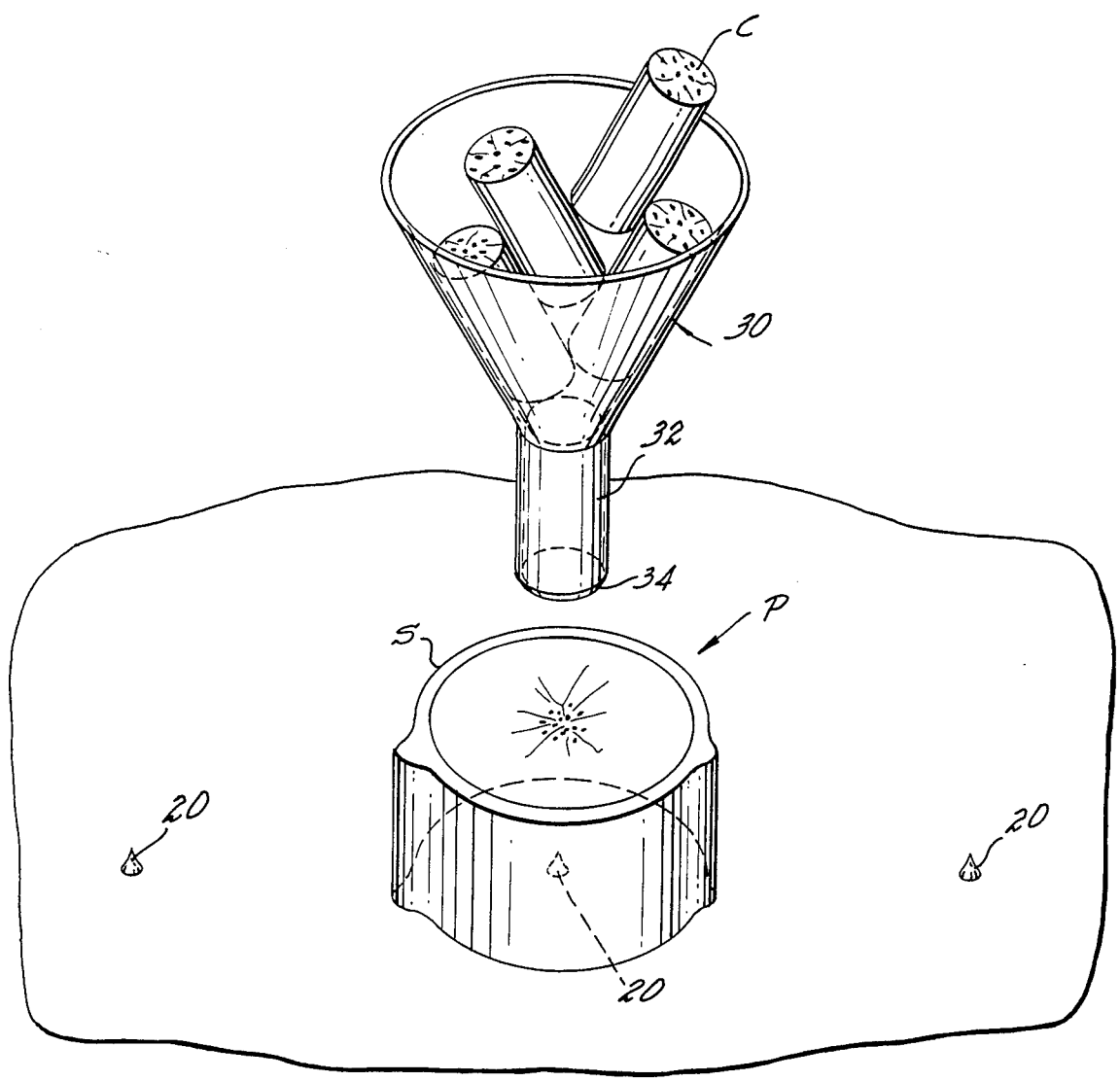
FIG. 2 shows a slice of the green plantain shown in FIG. 1 positioned on a guiding pin protruding from a flat surface and a core remover above the slice ready to operate.
Figure 3:
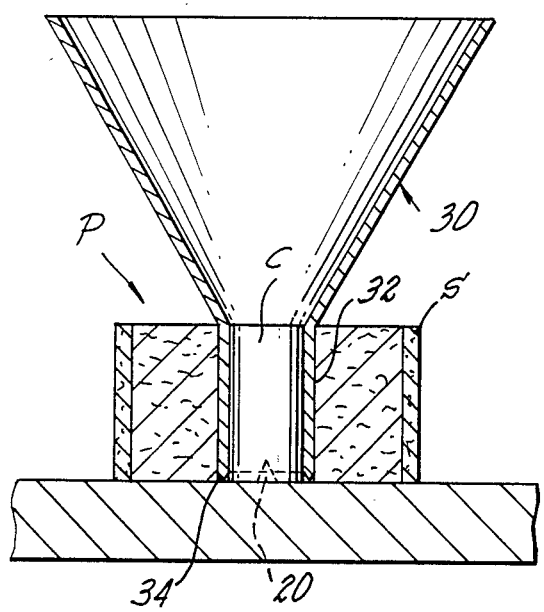
FIG. 3 illustrates a cross-sectional view of the core remover cutting through the middle of the slice.
Figure 4:
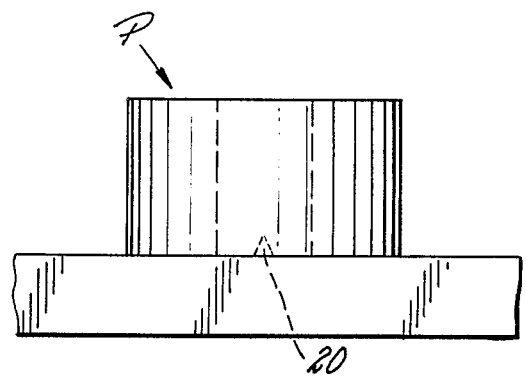
FIG. 4 is a representation of the slice with the skin and core removed.

The present process invention has been sequentially represented in FIGS. 1 through 5. Basically, the first step of the process is to slice a green plantain radially as illustrated in FIG. 1. Then, the slice is positioned on a flat surface as shown in FIG. 2. Preferably, guiding pins 20 will be used to position plantain slice P in a predetermined space. This is particularly useful when this process is automated since it provides a predetermined location for this slice to be positioned. Next, the core C is removed by using a suitable device such as core removing member 30 shown in FIG. 3. Core remover member 30 has substantially a conical shape that terminates with a cylindrical portion 32. Cylindrical portion 32 has cutting edges 34 sufficiently sharp to easily cut through plantain slice P. Skin S provides some degree of structural stability to slice P while at the same time it provides protection from human contact with the plantain itself. The person preparing the plantain may handle the plantain by holding it from the area where the skin is still attached to the slice. After that, slice P is peeled off and immersed in a water solution of salt and lemon juice intended to bleach the plantain and provide protection against oxidation. Preferably, one ounce of lemon juice for each gallon of water is used and two ounces of salt. As an alternative, slice P may be peeled off prior to removing core C. It is well known that fruits, including plantains and bananas, become dark in areas where they are touched and exposed to oxidation.

Figure 5:
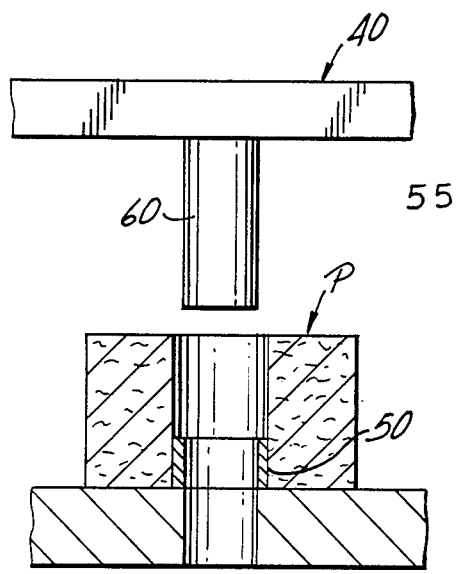
FIG. 5 is a cross-sectional view of the slice after being placed on a tubular guide that protrudes through a flat surface and a flattening or smashing member above it.
Figure 6:
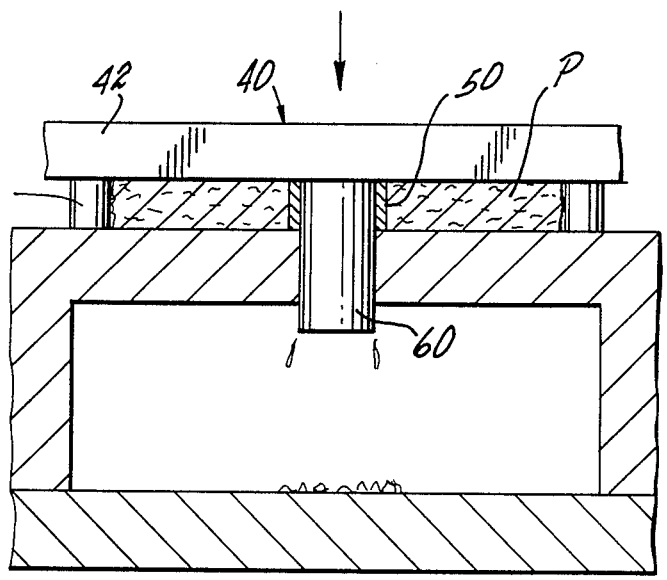
FIG. 6 shows the operation of the flattening member as it is guided through the tubular member punching any plantain excesses extending towards the middle of the slice.

The next step involves precooking the plantain slice which is accomplished by a brief immersion in hot vegetable oil preferably at 275° F. In FIG. 5, the next step of the process is illustrated where a smashing or flattening member 40 is used to flatten out slice P. The opening formed by removing core C is positioned over guiding tubular member 50. Flattening device 40 includes cylindrical rod 60 that is receivable within guiding tubular member 50 so that when plantain slice is flattened any portions thereof that move inwardly are punched through tubular member 50 and discarded. A stop member 55 is used to prevent flat member 42 from smashing slice P excessively. The resulting product is then frozen.

After this process the resulting product is a smashed plantain slice with the middle core C removed. Core C includes the seeds of the plantain. The seeds in the center of a slice of fried green banana or plantain is undesirable, especially after being smashed and the seeds compressed because it produces an area that is relatively hard. This process allows for minimal handling of the plantain and by removing the core it makes it easier to cook when it is eventually fried by the consumer. Also, by eliminating the extra weight the cost of transportation is greatly reduced.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. A process for preparing green plantains comprising the steps of:
   A. radially slicing said plantains;
   B. removing the core from said slices;
   C. peeling off said slices;
   D. frying said slices;
   E. flattening said slices; and then
   F. freezing said slices.

2. The process set forth in claim 1 further including the step of:
   G. immersing said slices after being peeled off in a solution of water, salt and lemon juice.

3. As an article of manufacture, a product prepared in accordance with the process of claim 1.

4. As an article of manufacture, a product prepared in accordance with the process of claim 2.

5. A process for preparing green plantains comprising the steps of:
   A. radially slicing said plantains;
   B. peeling off said slices;
   C. removing the core from said slices;
   D. frying said slices;
   E. flattening said slices; and then
   F. freezing said slices.

6. As an article of manufacture, a product prepared in accordance with the process of claim 5.

* * * * *